United States Patent [19]

Neugebauer

[11] Patent Number: 4,602,874
[45] Date of Patent: Jul. 29, 1986

[54] SUPPORT OF A MACHINE TOOL SPINDLE WITH COOLING DEVICE IN A HEADSTOCK

[75] Inventor: Heinz Neugebauer, Weidach, Fed. Rep. of Germany

[73] Assignee: Werkzeugmaschinenfabrik Adolf Waldrich Coburg GmbH & Co., Coburg, Fed. Rep. of Germany

[21] Appl. No.: 794,902

[22] Filed: Nov. 4, 1985

[30] Foreign Application Priority Data

Nov. 29, 1984 [DE] Fed. Rep. of Germany ... 8435005[U]

[51] Int. Cl.[4] ............................................. F16C 37/00
[52] U.S. Cl. .................................... 384/476; 384/321
[58] Field of Search ............... 384/476, 900, 317, 321, 384/313, 316, 551, 489

[56] References Cited

U.S. PATENT DOCUMENTS

| 2,356,578 | 8/1944 | Galtney | 384/476 |
| 2,714,538 | 8/1955 | Hornbostel | 384/476 |
| 3,706,483 | 12/1972 | Irwin | 384/476 |
| 3,965,974 | 6/1976 | Sernetz et al. | 384/321 |

Primary Examiner—Lenard A. Footland
Attorney, Agent, or Firm—Flynn, Thiel, Boutell & Tanis

[57] ABSTRACT

In a support for a machine tool spindle (1) adapted for use with a cooling device there are provided feed and discharge channels (12, 13) for a fluidic cooling system in the spindle (1). These channels are connected to cooling grooves (14), which at least in the region of the inner bearing rings (2a) are arranged on the spindle head (1a), are worked into the spindle outer surface (1b) extending in a peripheral direction or helically and are open toward the inner bearing rings (2a).

7 Claims, 2 Drawing Figures

4,602,874

SUPPORT OF A MACHINE TOOL SPINDLE WITH COOLING DEVICE IN A HEADSTOCK

FIELD OF THE INVENTION

The invention relates to a support for a machine tool spindle adapted for use with a cooling device in a headstock, in which a fluidic cooling medium is fed through feed and discharge channels, which extend parallel with respect to the spindle axis, to the inner bearing rings of the spindle bearings.

BACKGROUND OF THE INVENTION

In machine tools, the spindles of which rotate at a high speed, heat is generated in the roller bearings due to bearing friction, which heat is transmitted both onto the spindle and also onto the headstock. Due to an uneven temperature distribution in the bearing parts and the spindle, there results a shifting of the working or machining tools in direction of the spindle axis and radially of the axis of rotation of the tools, thereby rendering inexactnesses in the machining process. It is therefore common to forcedly cool the roller bearing outer rings by means of a cooling device. A cooling of the outer bearing rings, however, is not sufficient in view of the present demand for higher speed ranges and increasing requirements for precision. Only a very small portion of the heat which accumulates at the inner bearing rings can be discharged by a cooling of the outer bearing rings.

In order to also discharge heat from the inner bearing rings, a bearing sleeve which encloses the outer bearing rings is provided in a support for a machine tool spindle adapted for use with a cooling device of the above-mentioned type (German OS No. 19 57 974). The bearing sleeve has an axially parallel feed channel which, in the area of the roller bearings, is connected through crossbores to the inside of the roller bearings. The bearings sleeve has furthermore a discharge channel for the cooling medium which, near the spindle head, enters from the inside of the roller bearings into an annular chamber connected to the discharge channel. Lubricant oil is used as the cooling medium and is fed by means of a pump through the feed channel to the inside of the roller bearings. The lubricant oil in this manner reaches directly the inner bearing rings and also the outer bearing rings. The lubricant flows successively through the various roller bearings until it finally flows into the annular chamber, which is provided on the spindle head, and flows back from same through the discharge channel and an oil cooler into a storage container. This apparently simple solution is, however, in view of the cooling action little effective. That is, the roller members which rotate at a high speed create an oil foam which consists of oil and air, which oil foam is little suited for effecting a discharge of the heat. Furthermore, through the turbulence of the oil on the inside of the roller bearings heat is generated which in turn increase the amount of the accumulating heat. Since a satisfactory heat discharge cannot be assured in this known support, an additional correcting device is provided which controls the axial position of the spindle in response to its temperature. Such a correcting device, however, assumes that a bearing sleeve is axially movable in the headstock and furthermore complicated control devices are needed.

The basic purpose of the invention is to provide a machine tool spindle adapted for use with a cooling device in a headstock of the above-mentioned type, which is of a simple design and assures a satisfactory heat discharge from the inner bearing rings and thus secures a high operating speed and a simultaneous increase in the lifespan of the roller bearings.

This purpose is attained according to the invention by the feed and discharge channels being provided in the spindle and being connected with cooling grooves which, at least in the region of the inner bearing rings are arranged on the spindle head and extend in a peripheral direction or helically, are worked into the spindle outer surface and are open toward the inner bearing rings.

Through these relatively simple measures, a good lost heat discharge from the hub area of the inner bearing rings is assured. Since the cooling medium is guided through the cooling grooves to the inner bearing rings, it does not contact the roller members and, as a result, a foaming of the cooling medium is prevented, so that same can develop its full cooling action. Through a satisfactory heat discharge of the lost heat from the inner bearing rings, a heat transfer onto the spindle and its bearing parts is avoided and thus a high operating precision is also assured. Compared with supports adapted for use with a cooling device in which only the outer bearing rings are cooled, the inventive support also has a better cold-start behavior, because possible heat expansions do not need to be considered in measuring the bearing clearance. Finally, a good heat discharge from the inner bearing rings also leads to an increase in the life of the roller bearings.

BRIEF DESCRIPTION OF THE DRAWINGS

The invention will be discussed in greater detail with reference to the exemplary embodiments which are illustrated in the drawings, in which.

DETAILED DESCRIPTION

Figure 1:
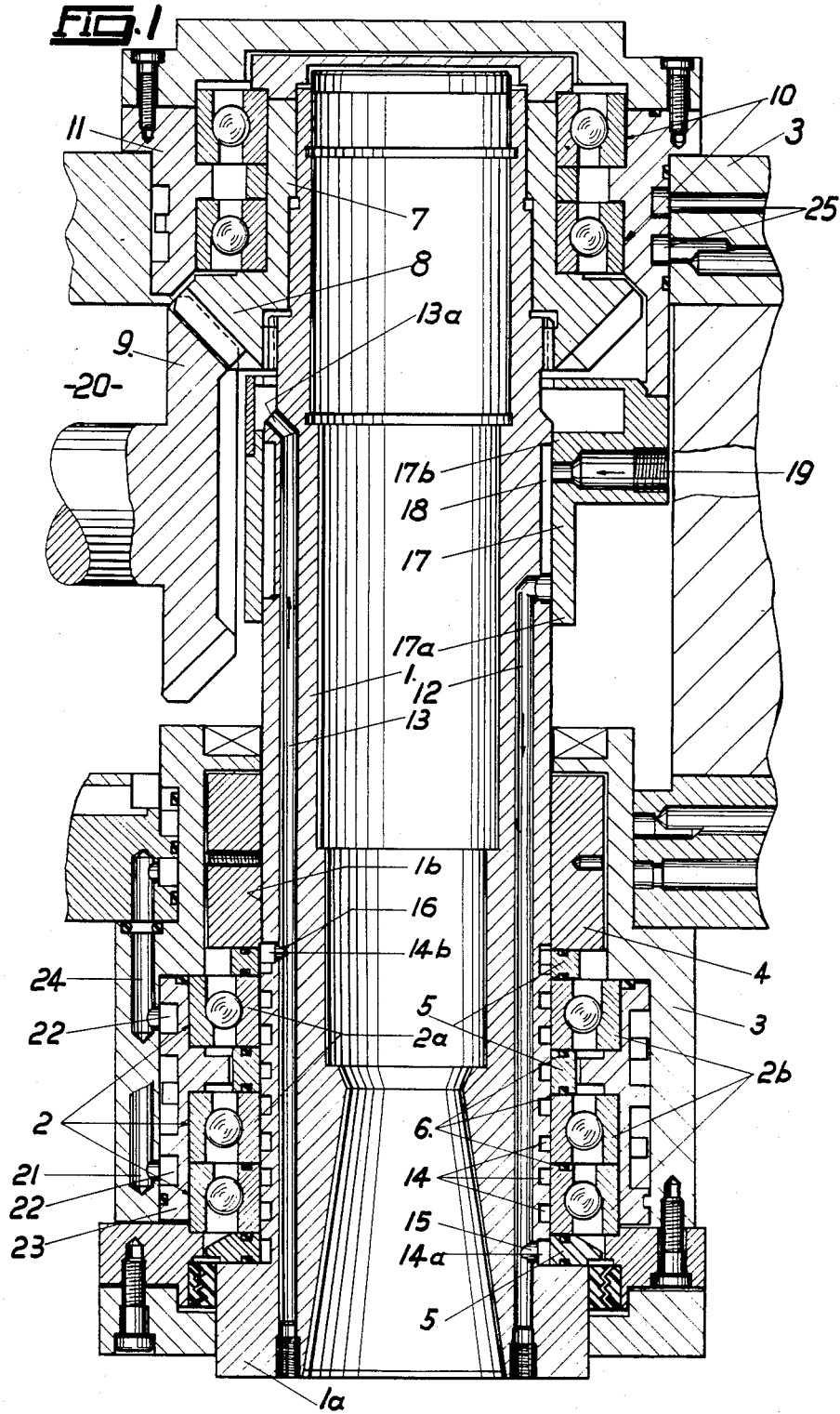
FIG. 1 is an axial cross-sectional view of a first exemplary embodiment.

The machine tool spindle 1 is rotatably supported in a headstock 3 near its spindle head 1a by means of several roller bearings 2. Gauge rings 5, which rotate with the spindle 1, are provided between each of the inner bearing rings 2a of two mutually adjacent roller bearings and between the endmost inner bearing rings 2a and the parts 1a and 4. Each of the gauge rings 5 have, in this exemplary embodiment, on their axially facing surfaces, which surfaces engage the axially facing surfaces on adjacent inner bearing rings 2a, annular grooves in which are provided gasket rings 6.

The hub 7 of a bevel gear 8 is fixedly mounted on the inner end of the rotatable spindle 1. The bevel gear 8 is driven by another bevel gear 9. The bevel gear hub 7 is supported by roller bearings 10 and an intermediate sleeve 11 in the headstock 3.

Two axially parallel channels, namely, a feed channel 12 and a discharge channel 13 are provided in the spindle 1 and are offset or arcuately spaced at 180° with respect to one another.

Cooling grooves 14 are provided in the outer surface 1b of the spindle 1 in the region of the inner rings 2a, which inner rings 2a are provided near the spindle head 1a. The cooling grooves 14 extend helically in this exemplary embodiment and preferably have a rectangular cross section. The grooves 14 can, if necessary, however, also have a trapezoidal or semicircular cross section. The cooling-medium grooves 14 are open radially outwardly toward the inner bearing rings 2a. The exiting of cooling medium into the inside of the roller bearings 2 is prevented by the gasket rings 6.

In order for flow to occur through the cooling grooves 14 in the counter-flow principle, the cooling groove 14a which is the closest to the spindle head 1a is connected to the feed channel 12 through a connecting bore 15. The cooling groove 14b most remote from the spindle head 1a is connected to the discharge channel 13 through a connecting bore 16. The discharge channel discharges at the point 13a into the gear transmission housing.

The spindle 1 is encircled by a sleeve 17 at the upper end of the feed channel 12 to define an annular chamber 18 between a portion of the sleeve 17 and the spindle. The sleeve 17 has an inlet bore 19 therein which is connected to a not illustrated cooling-medium pump with integrated cooler. The sleeve 17 encloses at its two ends 17a and 17b the outer surface of the spindle in such a manner that a hydrostatically acting sealing gap is formed between the outer surface of the spindle and the sleeve 17. In place of the sleeve 17 it could also be possible to provide any desired other feed mechanism which makes possible the supply of a fluidic medium from a stationary part to a rotating part. For example the cooling-medium supply could also occur on the front side at the inner end of the spindle 1. Also it would be conceivable, that the cooling-medium discharge occurs through a sleeve similar to the sleeve 17. However, it is simpler to permit the discharge channel 13 to discharge into the gear transmission housing. The condition for this is that transmission lubricant is used as the cooling medium. The cooling medium is again fed from the gear housing 20 through the cooler to the not illustrated pump.

The frictional heat which is created at the inner rings 2a of the roller bearings is continuously discharged through the cooling medium which directly interfaces with the inner rings 2a, so that a heating up of the spindle 1 is impossible and, also at high spindle speeds, the precision working characteristic is maintained. Pressure and/or amount and temperature of the cooling medium which is fed through the feed channel 12 and the cooling grooves 14 to the inner rings are regulated in accordance with a command variable, preferably the room temperature, so that the temperature of the spindle, measured at a representative measuring point, corresponds, as much as possible, exactly with the room temperature.

The cooling of the outer rings 2b of the roller bearings occurs in a common manner by means of a cooling medium fed through a feed bore 21 provided in the headstock 3 to cooling grooves 22 provided in an intermediate sleeve 23 which surrounds the outer rings 2b. The heated-up cooling medium is discharged through the outlet bore 24. The upper roller bearings 10 are cooled in a similar manner by cooling medium which flows through the cooling medium grooves 25 in the intermediate sleeve 11. If necessary, it is also possible to cool the inner rings of the roller bearings 10 in a similar manner, as this was described with respect to the inner rings 2a of the lower roller bearings 2. However, the drive of the spindle should then occur above the upper roller bearings 10.

Figure 2:
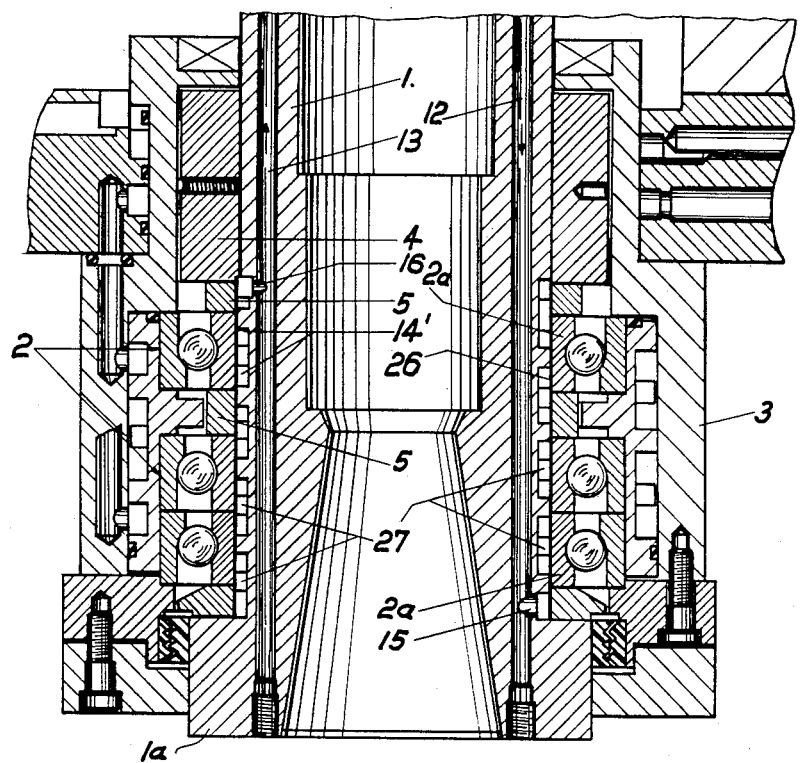
FIG. 2 is an axial cross-sectional view of a second exemplary embodiment.

The exemplary embodiment which is illustrated in FIG. 2 corresponds in important parts with the exemplary embodiment which is illustrated in FIG. 1, for which reason the same reference numerals have been used and the above description is accordingly pertinent. In the exemplary embodiment which is illustrated in FIG. 2, there is, however, arranged between the inner rings 2a of the roller bearings and also between the gauge rings 5 and the spindle outer surface 1b a thin-wall sleeve 26 of a good heat-conducting material. This thin-wall sleeve 26 prevents the exiting of the cooling medium into the inside of the roller bearing, so that the gasket rings 6 are not needed. The heat flow from the inner rings 2a is hardly influenced by the thin wall of the sleeve 26 and its good heat conductivity.

Furthermore, the cooling grooves 14' which are worked into the spindle outer surface 1b are in this case not arranged helically, but are constructed as peripherally extending grooves. Each of the cooling grooves 14' is thus closed in itself. The individual cooling grooves 14' are connected with one another through axial connecting grooves 27. In order for the cooling medium to indeed completely flow through the cooling grooves 14', it is advantageous if the connecting grooves 27 are arranged alternately offset at 180° with respect to one another.

The embodiments of the invention in which an exclusive property or privilege is claimed are defined as follows:

1. In a support for a machine tool spindle adapted for use with a cooling device in a headstock, in which a fluidic cooling medium is fed through feed and discharge channels extending parallel with respect to a spindle axis to inner bearing rings of plural spindle bearings, the improvement comprising wherein said feed and discharge channels are provided in said spindle and are connected to cooling grooves, which at least in the area of said inner bearing rings, are arranged on an outer surface of said spindle head and extend in one of a peripheral direction and helically, and open toward said inner bearing rings.

2. The support according to claim 1, wherein said cooling grooves extend in said peripheral direction and are connected among one another through several connecting grooves which extend axially.

3. The support according to claim 2, wherein said connecting grooves are arranged between adjacent cooling grooves alternately offset at 180° to one another.

4. The support according to claim 1, wherein said cooling grooves have a rectangular cross section.

5. The support according to claim 1, wherein said feed channel terminates at an axial end face on said spindle head adjacent an endmost cooling groove and said discharge channel is connected to said cooling grooves most remote from said axial end face.

6. The support according to claim 1, wherein a thin-wall sleeve of a good heat-conducting material is provided between said inner rings and said spindle outer surface in the region of said cooling grooves.

7. The support according to claim 1, wherein in the region of said cooling grooves between adjacent inner rings and other parts which rotate with said spindle there are provided gauge rings which have annular grooves in axially facing surfaces thereon for receiving gasket rings which mate with said inner bearing rings and the parts which rotate with said spindle.

* * * * *